United States Patent [19]

Kronlage et al.

[11] Patent Number: 4,809,211

[45] Date of Patent: Feb. 28, 1989

[54] HIGH SPEED PARALLEL BINARY MULTIPLIER

[75] Inventors: John W. Kronlage, Richardson; Liem T. Nguyen, Plano; Jeffrey A. Niehaus, Dallas; Robert D. Maher, Carrollton; Stephen H. Li, Garland, all of Tex.

[73] Assignee: Texas Instruments Incorporated, Dallas, Tex.

[21] Appl. No.: 912,013

[22] Filed: Sep. 25, 1986

[51] Int. Cl.[4] .............................................. G06F 7/52
[52] U.S. Cl. .................................................... 364/754
[58] Field of Search ............... 364/754, 757, 736, 760, 364/759

[56] References Cited

U.S. PATENT DOCUMENTS 4,238,833 12/1980 Ghest et al. ........................ 364/760
4,405,992 9/1983 Blau et al. ....................... 364/759 X

FOREIGN PATENT DOCUMENTS 59245 9/1982 Japan .................................. 364/757
58542 4/1984 Japan .................................. 364/754

OTHER PUBLICATIONS

Blaauw et al., "Binary Multiplication", IBM Technical Disclosure Bulletin, vol. 4, No. 11, Apr. 1962, pp. 32–34.

Primary Examiner—Gary V. Harkcom
Assistant Examiner—Tan V. Mai
Attorney, Agent, or Firm—Thomas R. Fitzgerald; Leo N. Heiting; Melvin Sharp

[57] ABSTRACT

An n×n bit multiplier of a type having input and output registers and associated multiplexers, a multiplier array and adders, a shifter and an accumulator. The multiplier includes a temporary register having an input coupled in parallel with an input of the accumulator to an output of the shifter and an output coupled to a multiplexer for controlling the flow of output data from the temporary register to the multiplier array. The temporary register is responsive to a SELREG control signal to become enabled and disabled. An input of the shifter is coupled to an output of the adder.

11 Claims, 1 Drawing Sheet

HIGH SPEED PARALLEL BINARY MULTIPLIER

BACKGROUND OF THE INVENTION

The present invention relates a binary VLSI (Very Large Scale Intergration) multiplier device capable of multiplying operands with a large number of bits.

A conventional microprocessor in carrying out multiplication on, say, two 32 bit operands uses 32 clock signals as well as software programming. An alternate approach is to utilize hardware rather than software in addition to microprogramming. A standard hardware approach is to use an add-shift method in which each partial product is shifted one position to the left and then added to an accumulated sum of previously computed partial products. For 32 bit operands this method requires 32 different addition steps in calculating the accumulated sum of partial products. Considering that a large proportion of the delay in passing through a multiplier occurs in the adder, the foregoing method is relatively slow. This number of steps can be reduced substantially by partitioning the multiplier into a selected number of segments, say "m" partial products. This reduction in the number of partial products results in a faster multiplication operation although additional overhead cycles are required to load the different versions of the multiplicand into a local store.

An even faster approach is a one-step combinational planar array multiplier. In this case the bits of the operands are partitioned into high order and low order bits and the partial products formed into four groups corresponding to the four groupings of the high and low order bits termed non-additive multiply modules (NMM's). Each group of NMM's is sent to a corresponding array of combinational AND circuits which output the individual product terms of each NMM. Some of these product terms are directed to bit-slice carry-save adders, known as Wallace trees which produce the sum of the inputs. Alignment of the sub-products is accompanied by inputting them to the appropriate Wallace tree. The sum and carry outputs from each Wallace tree are sent to a conventional binary adder with carry lookahead, which merges the two outputs into the final output.

Accordingly, it is an object of the present invention to provide an improved multiplier circuit. It is a further object of the invention to provide a multiplier circuit in which the accumulator is part of partial product summing loop. Yet a further object of the invention is to provide a multiplier array in which a register is optionally bypassed for flowthrough operation.

SUMMARY OF THE INVENTION

According to the invention there is provided a multiplier circuit which employs a temporary register whose input is coupled in parallel with the input of the accumulator to a shifter. Clock signals applied to the temporary register and accumulator determine whether the shifter output is stored in the temporary register or in the accumulator. The temporary register can be used to store temporary data, constants and scaled binary fractions.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION WITH REFERENCE TO THE DRAWINGS

Figure 1:
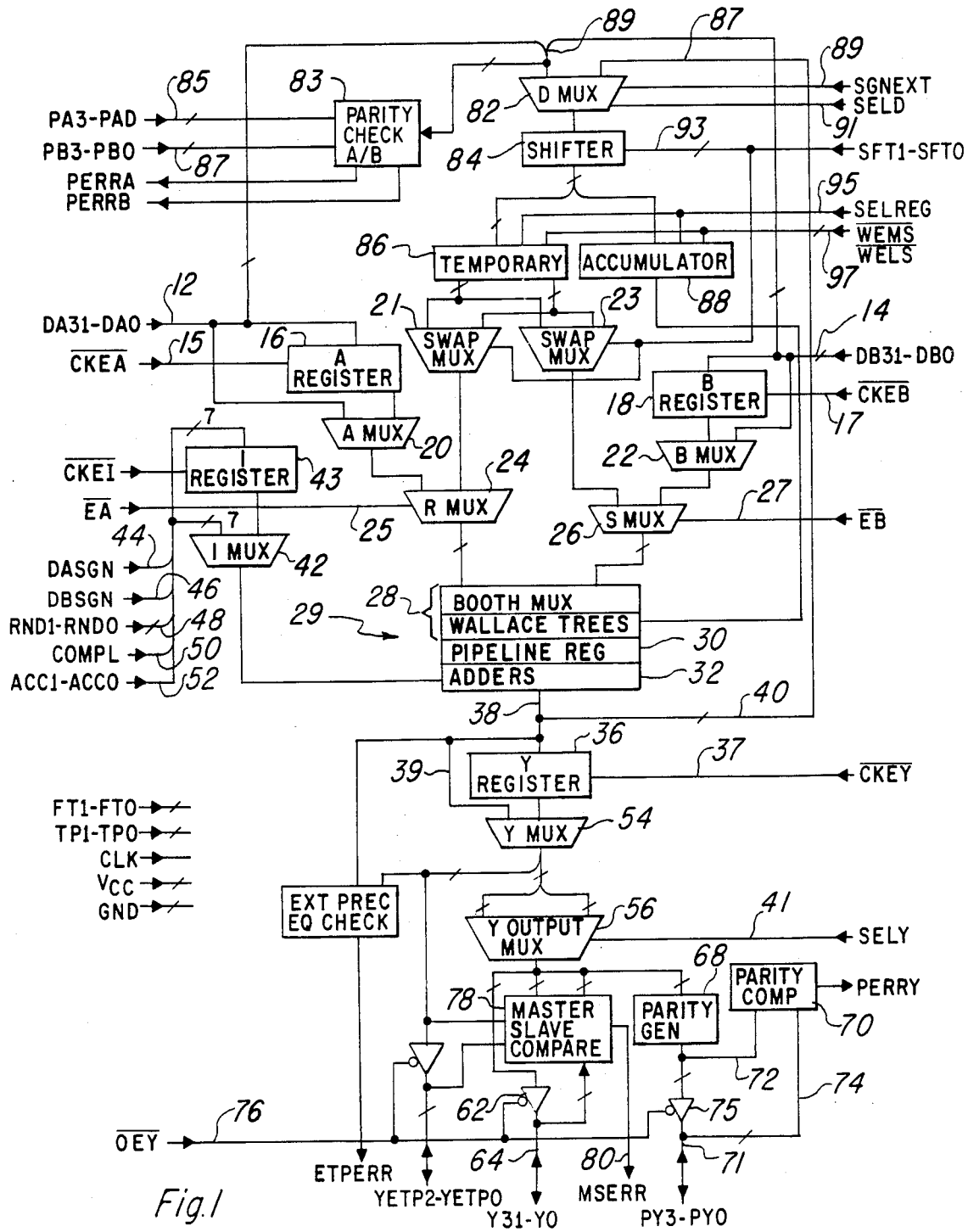
FIG. 1 is a block diagram of a preferred embodiment of the multiplier circuit.

Referring to FIG. 1, there is shown a block diagram of a multiplier circuit. The multiplier circuit includes two bit input ports 12 and 14 labelled DA and DB, respectively. In the preferred embodiment input ports 12, 14 are each 32 bit input ports. Input ports DA and DB connect to A register 16 and B register 18, respectively, which serve to temporarily hold the input data values until they are clocked out. Independent clock enable signals $\overline{CKEA}$ and $\overline{CKEB}$ coming in on lines 15 and 17, respectively, serve to make A register 16 and B register 18, respectively, transparent when flowthough operation is desired. The output from A register 16 is directed to an input of A multiplexer 20 while that from B register 18 is directed to an input of B multiplexer 22. Second inputs to A and B multiplexers 20 and 22, respectively, come directly from DA line 12 and DB line 14, respectively. A and B multiplexers 20 and 22, respectively, select input directly from DA and DB parts, respectively, for flowthrough operation in which case A and B registers are disabled.

The outputs from R and S multiplexers 20 and 22, respectively, are connected as inputs to R multiplexer 24 and S multiplexer 26, respectively. Multiplexer enable signals $\overline{EA}$ and $\overline{EB}$ on lines 25 and 27, respectively, cause A and B multiplexers 24 and 26, respectively, to select inputs from A and B multiplexers, respectively. Outputs from R and S multiplexers 24 and 26 are fed to the input of a multiplication unit 28 made up of a Booth multiplexer followed by a Wallace Tree. The output of the Wallace Tree which is a bit slice summing circuit that adds sub-products generated by the non-additive multiply modules or NMM's is fed to a pipeline register 30 followed by an adder 32. The Booth multiplexer generates partial products according to Booth's algorithm which is a technique for doing signed number multiplication or 2's complement multiplication for reducing the number of logic circuits. This is accomplished by reducing the number of partial products in certain cases.

The pipeline register 30 allows reduction of the clock period required by breaking u the delay period into segments, including some segments external to the device. The delay period for the segment having the longest delay determines the clock period. Thus, the path between registers is shorter with an associated shorter delay although additional clock cycles are sacrificed before the first valid data becomes available at the output.

The output from the multiplier array 29 on line 38 couples to the input of Y register 36 and then to Y multiplexer 54. There is also a bypass line 39 coupled from line 38 directly into another input to Y multiplexer 54 for bypassing the Y register during flowthrough operation. A Y register disable signal $\overline{CKEY}$ on line 37 allows loading of the Y register 36 when $\overline{CKEY}$ is low. The output of the Y multiplexer 54 for DA and DB data ports each being 32 bit is a 64 bit word. This result is fed to the Y output multiplexer 56 in two separate blocks of 32 bits each. A SELY signal on line 41 allows passage of the lower 32 bits when it is low and the upper 32 177 bits when it is high. The Y multiplexer is designed to switch at twice the clock and then passed through gate 62, controlled by $\overline{OEY}$ clock signal on line 76 into Y-bus 64.

A parity check on data arriving on DA and DB ports 12 and 14, respectively, is done for each 8 bits of data on each of ports DA and DB by dividing each 32 bit word into 4 bytes and comparing the parity of each byte with that represented by a corresponding bit on each of parity ports PA and PB, respectively. Any difference between the parity determined and that expected results in a parity error signal PERRA OR PERRB on lines 85 and 87, respectively. A similar arrangement is installed at the output in the form of a parity generator 68 having an input coupled to the output of Y output multiplexer 56. The generated parity for each 4 bytes is outputted along line 72 to an input of parity comparator 70 as well as through gate 75. The expected parity of the output signal is fed in on PY port 71 and travels along line 75 into parity comparator 70. Parity comparator 70 compares the determined parity with the expected parity and any difference is reflected in an error signal PERRY being generated.

A D multiplexer 82 has two inputs 87 and 89. In response to a SELD control signal o line 91 being high input 89 coupled to DA and DB ports 12 and 14, respectively, is selected. In the latter case a 64 bit word formed by concatenating DA and DB bus data is formed and directed into a shifter 84. Input 87 coupled to output line 38 from the multiplier 29 is selected when SELD is low causing what is a 67 bit output from the multiplier array 29 to pass to the shifter. The shifter 84 shifts in response to selected combinations of two bit control signal on line 93 coupled to SFT port. If both bits of the SFT word are zero then the data is passed without being shifted. If SFT1 is 0 and SFT0 is 1 then there is a shift one bit left and the vacated bit is set at 0. A 1 on both bits causes a 32 bit right shift with a sign bit used to fill the vacated bit positions.

The output of the shifter 84 is fed to both a temporary register 86 and an accumulator register 88. When control signal SELREG is high then the shifter 84 stores its output in the temporary register 86 while when the shifter 84 is low it stores it in the accumulator register 88. Separate clock controls, $\overline{WELS}$ and $\overline{WEMS}$ on line 97 allow the most significant and least significant halves of the shifter output to be loaded separately. The 32 least significant bits of the selected register are loaded when $\overline{WELS}$ is low; the most significant bits when $\overline{WEMS}$ is low. When $\overline{WELS}$ and $\overline{WEMS}$ are both low, the entire word from the selected register is loaded. The temporary register 86 can be used to store temporary data, constants and scaled binary fractions. The output of the temporary register is fed to two swap multiplexers 21 and 23. The swap multiplexers 21 and 23 are controlled by the shifter control inputs SFTI and SFT0. When SFT1=1 and SFT0=0, the most significant half of the temporary register is available to the S multiplexer, and the least significant half is available to the R multiplexer. When SFT1-SFT0 are set to other values, the most significant half of the temporary register is available to the R multiplexer and the least significant half is available to the S multiplexer. With $\overline{EA}$ high, the R multiplexer selects data from DA or the A register, depending on the state of the flowthrough control inputs. When $\overline{EB}$ is low, the S multiplexer selects data from the swap multiplexer. When $\overline{EB}$ is high, the S multiplexer switches data from DB or the B register, depending on the state of the flowthrough control inputs.

The accumulator 88 is 67 bits wide to accommodate possible overflow. Its output is coupled to the adder where it is added or subtracted from the multiplier result.

Instruction inputs to the device are fed through an I multiplexer 20 either from an I register 43 if control signal $\overline{CKEI}$ is low or bypassing the I register 43 if $\overline{CKEI}$ is high. The output of the I multiplexer 42 is coupled to the adder 32. Sign control inputs DASGN on line 44 and DBSGN on line 46 identify DA and DB input data as signed (high) or unsigned (low). Rounding signals RND1-RND0 on line 48 control rounding operations in the multiplier/adder. With RND1 and RND0 both low the results pass through the multiplier array 29 unaltered. If a high appears on RND0, the result will be rounded by adding a one to bit 30. Ordinarily, RND0 is set high in order to maintain precision of the least significant bit following the shift operation. With RND1 high, the result will be rounded by adding a one to bit 31.

A complement control, COMPL, is used to complement the product from the multiplier before passing it to the accumulator. The complement will occur if COMPL is high while the result will be passed unaltered by this function if COMPL is low. The control inputs ACC1-ACC0 control the operation of the multiplier array. The output from the multiplier array 29 may be expressed generally as the following:

$$Y = \pm(A \times B) \pm R_B$$

where the sign before the product term $(A \times B)$ is determined by the value of the control input COMPL while that in front of the term $R_B$ which represents the previous value computed by the multiplier 28 is determined by the control inputs ACC0 and ACC1.

Coupled to an output of the Y output multiplexer 56 is a master/slave comparator 78. Comparator 78 compares data bytes from the Y output multiplexer with data bytes on the external Y port 74 when the control signal $\overline{OEY}$ is high. If the data being compared is not equal a high signal is generated on the master slave error output pin (MSERR) 80. Such an arrangement is useful for fault tolerant systems in which several devices are used in parallel to ensure hardware integrity.

The present system is able to do multiple precision multiplication through use of the shift register 84 to adjust the rank or position of the separate product terms of each multiplication addition sequence. After each multiplication-addition sequence and subsequent shifting, if any, the result is added to the value in the accumulator so that a running accumulation of summed product terms may be kept. In doing double precision the system operates in a flowthrough mode.

The pipeline register 3 is used to reduce the period of clock signals and t improve the throughput of the operation. In the flowthrough mode of operation the four registers I, A, B, and Y can all be bypassed allowing data signals from DA and DB ports to pass directly into the multiplier array 29 and from there directly to the Y output port when $\overline{CKEY}$ is high. By way of example, consider typically encountered delay times of 2 nanoseconds (ns) from the output of a previous stage (not shown) through the input register and multiplexer, another 2 ns through the input multiplexer, 5 ns through the Booth multiplexer, and 10 ns through the Wallace Tree there is typically 19 ns delay in the input stag through to the output of the multiplication stage. In the pipeline register 32 there is another 4 ns and 20 ns in the carry-look ahead, carry-save adder for a further 24 ns in the latter two stages. Finally in the Y register there is 4 ns, in the Y multiplexer there is 2 ns and in the input-/output stage another 5 ns for a total of 25 ns delay. The maximum delay incurred is therefore 25 ns which determines the minimum clock period that can be used in moving data through the various stages. The total time required to move data from the input bus 12 or 14 through to the Y output bus 64 without the pipeline register 30 inserted is 50 ns. Insertion of the pipeline register 30 means that the clock period for moving data through the multiplier circuit is broken up so that a clock period of 25 ns can be used instead of 50 ns. There would be an overhead of 2 clock periods at the outset in which there would be no data at the output, however.

A key feature of the present invention is the provision of the temporary register 86 coupled in parallel with the accumulator 88 to the output of the shifter 84. This allows iterative procedures to be carried out such as the Newton-Raphson binary division algorithm in which the product of a previous operation from the multiplier array can be recirculated and fed back to the temporary register as input for another iterative step. The temporary register also simplifies other such procedures such as numerical integration, complex multiplication, recursive and non-recursive filter calculations, and butterfly calculations.

While this invention has been described with reference to an illustrative embodiment, this description is not intended to be construed in a limiting sense. Various odifications of the illustrative embodiment, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. An n×n bit multiplier comprising:
    a shifter having a plurality of inputs, each shifter input for receiving multiple bits of data in a first order and a shifter output for outputting multiple bits of data of one of said shifter inputs in said first order or in a shifted order in response to a shifter control signal;
    a temporary register having an input coupled to the output of the shifter and an output coupled to first multiplex means;
    an accumulator having an input coupled to the output of the shifter and an output coupled an adder;
    said temporary register and said accumulator alternatively enabled or disabled by a SELREG control signal to receive the output of said shifter;
    first and second multiplex means for respectively receiving the output of the temporary register and a plurality of other inputs and outputting at least two multiplier operands;
    a multiplier array for receiving said operands from said first and second multiplex means, and for outputting partial products of said operands; and
    an adder coupled to said multiplier array for receiving said partial products output from the multiplier and the output of the accumulator for outputting the sum or difference of the adder inputs to an output coupled to one of the inputs of said shifter.

2. A multiplier according to claim 1, including a pipeline register having an input coupled to an output of said multiplier array and an output coupled to said adder and responsive to flowthrough control signals to be inserted and bypassed.

3. A multiplier according to claim 1, wherein said temporary register has 2n bits and is responsive to external control signals to transmit only its most significant bits, only its least significant n bits or all of its 2n bits stored therein and including swap multiplexers coupled to an output of respective most and least significant n bits for directing the most and least significant n bits into respective selected operand input lines of said multiplier array in response to a shifter control signal.

4. A multiplier according to claim 3, wherein said accumulator has 2n+3 bits, wherein 3 bits are positioned adjacent the most significant of the 2n bits for use as overflow and sign extension bits.

5. A multiplier according to claim 1, wherein said accumulator has 2n bits and is responsive to external control signals to transmit only its most significant n bits, only its least significant n bits or all or its 2n bits stored therein and has an output coupled to said multiplier array.

6. A multiplier according to claim 5, including a Y output register coupled to an output of said adder, a Y multiplexer coupled to an output of said Y register and a Y output multiplexer coupled to an output of said Y multiplexer, wherein said Y output multiplexer has 2n bits and n response to A and B levels of a SELY control signal, outputs the most significant and least significant n bits.

7. A multiplier according to claim 5, wherein n is 32.

8. A multiplier according to claim 1, wherein said multiplier array includes a Booth multiplexer for carrying out a Booth algorithm, wallace trees coupled to the output of said Booth multiplexer, and an adder coupled to outputs of said Wallace tree.

9. A multiplier according to claim 1, wherein said shifter includes a single bit left shift and a 32 bit right shift.

10. A multiplier according to claim 9, wherein said temporary register has 2n bit positions and has separate outputs for its most significant and least significant n bits, a first and second swap multiplexer each having inputs coupled to the most significant and least significant n bit outputs from the temporary register and each swap multiplexer having an output coupled to said multiplier array and said swap multiplexers operative to transmit on least significant and most significant input lines to said multiplier array the least and most significant bits, respectively, or the most and least significant bits, respectively, from said temporary register.

11. A multiplier according to claim 1 further comprising first and second n bit input ports and first and second input registers, said input ports respectively connected in series with said input registers and said input having respective outputs connected to respective first and second multiplex means.

* * * * *